US006678630B1

(12) United States Patent
Joder et al.

(10) Patent No.: US 6,678,630 B1
(45) Date of Patent: Jan. 13, 2004

(54) AUTOMATIC HEIGHT ADJUSTMENT IN AN ALTIMETER

(75) Inventors: Peter Joder, Kriens (CH); Lorenz Camenzind, Lucerne (CH)

(73) Assignee: Flytec AG (CH)

( * ) Notice: Subject to any disclaimer, the term of this patent is extended or adjusted under 35 U.S.C. 154(b) by 0 days.

(21) Appl. No.: 10/018,204

(22) PCT Filed: Mar. 13, 2000

(86) PCT No.: PCT/CH00/00143

§ 371 (c)(1),
(2), (4) Date: Feb. 19, 2002

(87) PCT Pub. No.: WO00/77473

PCT Pub. Date: Dec. 21, 2000

(30) Foreign Application Priority Data

Jun. 11, 1999 (CH) .............................................. 1090/99

(51) Int. Cl.$^7$ ........................... G01L 19/00; G06F 15/00
(52) U.S. Cl. ........................... 702/139; 702/98; 702/138
(58) Field of Search ............................. 702/33, 98, 99, 702/130, 139, 183, 91, 104; 73/181, 384; 340/963, 970

(56) References Cited

U.S. PATENT DOCUMENTS

| 4,951,047 | A | * | 8/1990 | Paterson et al. ............ 340/970 |
| 4,969,358 | A | * | 11/1990 | Peet, II ....................... 73/384 |
| 5,198,980 | A | * | 3/1993 | Patrick ......................... 701/29 |
| 6,449,573 | B1 | * | 9/2002 | Amos ........................... 702/98 |

FOREIGN PATENT DOCUMENTS

| DE | 4236357 | | 5/1993 |
| DE | 4236357 A1 | * | 5/1993 |

* cited by examiner

*Primary Examiner*—Bryan Bui
(74) *Attorney, Agent, or Firm*—Ostrolenk, Faber, Gerb & Soffen, LLP

(57) ABSTRACT

The invention relates to an altimeter for detecting and displaying the altitude above the sea level of a location by measuring the ambient atmospheric pressure. In order to compensate for changes in air pressure due to meteorological reasons, such as temperature, an adjustment or reset mechanism is provided with the purpose of adjusting or resetting the altimeter to a given stored height at a given moment. This is only effected if at that moment, the air pressure that has been measured indicates height coinciding with the given stored height within a predetermined tolerance limit.

28 Claims, No Drawings

AUTOMATIC HEIGHT ADJUSTMENT IN AN ALTIMETER

BACKGROUND OF THE INVENTION

1. Field of the Invention

The present invention relates generally to altimeters, and, more particularly, to a device and method for registering and displaying the altitude of a location above sea level.

2. Description of the Related Art

The air pressure measurement or the altitude measurement in a corresponding, for example electronic, measuring device is carried out by means of a pressure measuring sensor. This sensor functions on a mechanical basis in that a diaphragm in the interior of the housing bends slightly when changes in pressure occur. This change is measured and conditioned in an electronically converted fashion. Each pressure measurement and the altitude measurement which is derived therefrom is made according to this mechanical principle.

An altimeter calculates the altitude on the basis of the air pressure. Here, the air pressure at sea level is assumed to be a zero point pressure. This zero point pressure is referred to as QNH. If therefore an air pressure is measured at a specific altitude, said air pressure is derived by means of a calibration curve, determined by average air pressures at respective altitude locations. On the basis of continuously changing air pressure under different weather conditions at the same location, it is possible to obtain differences in altitude measured values by derivation. This difference is approximately 8 m per 1 mbar change in pressure. Due to weather, the average air pressure of, for example at sea level, approximately 1,013 mbar fluctuates between 950 and 1,050 mbar. In other words, a measurement at sea level can yield fluctuations in altitude values of the order of magnitude of approximately 1,000 m.

Even on a calm day, fluctuations in air pressure due to temperature of +/−1 mbar may occur. When there are rapid changes in the weather, for example cold fronts, the air pressure can change by up to 5 mbar within a day and the altitude deviation is thus approximately 40 m.

Due to these fluctuations in air pressure, an altimeter must be readjusted every time it is used if one wishes to have a correct display. This means that the altimeter must be reset at a known altitude, for example at home, in a railway station, a hut, etc., which is easy to forget. Altimeters are for this reason frequently no longer used because they are considered to be imprecise and unreliable as relatively large pressure fluctuations in the air pressure can lead to imprecise altitude values.

SUMMARY OF THE INVENTION

There is a need, therefore, for an improved device for registering and displaying altitude by measuring the ambient air pressure, and for an improved method for automatically correcting the altitude setting on a device for measuring the altitude above sea level by registering the ambient air pressure.

The present invention provides an altitude measuring device which provides better measuring accuracy and which is more user friendly.

According to the invention, an altitude measuring device is provided which permits automatic or semi-automatic setting of any one or more altitude values.

DETAILED DESCRIPTION OF EMBODIMENTS OF THE INVENTION

The present invention is directed to a device for registering and displaying the altitude of a location above sea level by measuring the ambient air pressure, a setting or resetting mechanism being provided in order to set or reset the device to a specific stored altitude setting at a specific time if the air pressure measured at this specific time indicates an altitude which corresponds to the determined, stored altitude setting within a pre-entered tolerance limit.

In other words, a specific altitude value can be set and stored, whereby this altitude value or the ambient air pressure associated with it is stored in a memory. If the location is not changed, the altitude measuring device makes note of this in that the measured ambient air pressure or the air pressure corresponding to the altitude of this location can vary only within a specific tolerance value, whereby the altitude measuring device can be reset automatically to the stored altitude setting at any time. The time when this setting or resetting is to take place can be defined as desired. This can be within a specific time interval or can be, for example, within a day starting from the storage. The time or the time interval when the resetting has to take place can even be defined by the user.

Thus, it is possible, for example, for the automatic registration of the ambient air pressure to take place in each case in the morning at 5 o'clock when a user of the altimeter is generally still in bed, and for the automatic resetting to the predefined altitude value to take place if the ambient air pressure which is registered then at 5 o'clock in the morning corresponds, within a tolerance interval, to that air pressure which corresponds to the stored altitude value. In this way, pressure fluctuations in the ambient air pressure are automatically compensated, and the starting altitude of the altitude measuring device always has the same value at 5 o'clock in the morning, irrespective of whether the location of the user, for example his apartment or his house, is in the vicinity of a high pressure area or of a depression. Because daily fluctuations in the air pressure are generally only a few millibars and relatively large pressure fluctuations only take place over a period of several days, there is thus always a relatively good precision of the altitude measurement, and in addition the person using the altitude measuring device does not need to remember to set or reset the altitude measuring device or set it to the starting altitude.

The automatic storage of the starting altitude or of the corresponding pressure can be carried out on the basis of a self-learning characteristic. This means that an integrated microprocessor recognizes the habits of a user and adapts them automatically. For example, if the user lives at a specific altitude and always keeps the altimeter at the same location, or if the user has the altimeter in his car and travels to work every morning, for example always at 8 o'clock, the microprocessor can detect that at 8 o'clock in the morning the altitude or the measured ambient air pressure is not the same as later in the day when the car is standing in front of the user's office or business. Thus, a plurality of automatic settings and resettings are possible even within the course of a daily routine in that, firstly, the altitude measuring device automatically performs setting or resetting to the altitude, for example of the car, at 8 o'clock in the morning before the user drives away to the office. Later in the day, for example at 2 p.m., the device is set or reset again to the altitude of the location where the user leaves his car, for example, during working hours. Of course, this automatic setting or resetting takes place whenever the respective measured air pressure lies within a tolerance limit which corresponds to the respective air pressure of the corresponding location. The automatic registration, storage and adaptation is in each case also only possible if the respectively measured air pressure lies within tolerance limits at specific, identical times of the day.

Further habits can also be detected and adapted, for example getting up later on a Sunday, getting up earlier when on holiday in order to go on trips in the mountains, etc.

In addition to the registration of the air pressure and the associated altitude, it is also possible to input further parameters and store them and associate them or combine them with the respective stored altitude values, said parameters being, for example, time of day, date, geographical location, data relating to holidays or work, etc.

In addition to this automatic registration and storage or setting or resetting, the intention is of course that it should also be possible to perform manual storage or manual setting or resetting and to call or use further functions in the altitude measuring device by means of a menu switching facility.

Finally, the intention is that it should also be possible to switch off the entire resetting mechanism and use the altitude measuring device manually, as is the case with conventional altitude measuring devices.

The device according to the present invention makes it possible for a user to perform altitude measurement in a more attractive way and to have the altitude of the respective location displayed to him, for which reason increased deployment or increased use of such altitude measuring devices is to be expected. However, because a user does not wish to carry a plurality of pieces of equipment around with him, it is appropriate to arrange an altitude measuring device according to the invention integrated in, for example, a watch such as a wristwatch, pocketwatch or in a pocketknife, etc. The altitude measuring device according to the invention is also suitable as a measuring and display arrangement in a car, integrated in the dashboard.

Altitude measuring devices according to the invention can have either one or more displays, for example what are referred to as LCDs, for indicating the measured air pressure on the one hand and/or the height above sea level which has been determined from said pressure, and for indicating the time, location, etc. It is also possible to provide input keypads for inputting, for example, geographical information into the device and for storing it combined with measured altitude values.

The embodiment variants given above of the altitude measuring device proposed according to the invention constitute merely examples of the way in which the altitude measuring device can be modified. Basically, it is possible to provide further measuring and display devices in the altitude measuring device or to combine the altitude measuring device with other equipment. The possibilities of variation, combination and modification are limitless, within the scope of the invention defined in the patent claims.

What is claimed is:

1. A system for registering and displaying an altitude above sea level, the system comprising:
   a memory for storing a predefined time, and at least one of a predefined altitude and a predefined ambient air pressure therein;
   an ambient air pressure measuring mechanism adapted to measure the ambient air pressure at the predefined time to provide an altitude reading;
   a comparing mechanism that performs a comparison of at least one of the measured ambient air pressure and the altitude reading with the corresponding one of the predefined ambient air pressure and the predefined altitude;
   a setting mechanism that maintains at least one of the predefined ambient air pressure and the predefined altitude after determining that the result of the comparison is within a predetermined range; and
   a display that displays the predefined altitude after said determination.

2. The system of claim 1, further comprising a time registering unit that schedules operation of at least one of the ambient air pressure measuring mechanism, the comparing mechanism, and the setting mechanism.

3. The system of claim 2, wherein the time registering unit schedule is determined at least in part by at least one of time of day, day of week and week of month and month of year.

4. The system of claim 1, further comprising an altitude-registering mechanism adapted to store the altitude reading in the memory after determining that the comparison indicates that the altitude reading is within the predetermined range, and to replace the value of the predefined altitude with the value of the altitude reading.

5. The system of claim 4, wherein the altitude registering unit further stores at least one of the predefined altitude value and the altitude reading value in the memory.

6. The system of claim 5, further comprising a plurality of altitude reading values stored in the memory.

7. The system of claim 6, wherein the setting mechanism uses one of the plurality of altitude reading values stored in the memory to set the system.

8. The system of claim 1, wherein the memory further stores additional information corresponding to the altitude reading value.

9. The system of claim 8, wherein the additional information includes air pressure, time of day when the air pressure is measured, the location where the air pressure was measure.

10. The system of claim 1, further comprising a menu switching facility adapted to switch between at least one of registering modes, operating modes and display modes.

11. The system of claim 1, wherein the memory further stores geographic information, current time and current date, and wherein the display further shows at least one of the current time, the current date and the geographic information.

12. The system of claim 1, further comprising an input device adapted to:
   receive information from a user, the information representing at least one of altitude, geographic location and current time; and
   to store the information in the memory.

13. The system of claim 12, wherein the information includes geographic location information.

14. The system of claim 1, wherein the system is incorporated into at least one of a time keeping device and a pocket knife.

15. A method for correcting the altitude setting on a device for measuring the altitude of a location above sea level, the method comprising:
   setting at least one of an initial altitude parameter to a predefined altitude value and an initial air pressure parameter to a predefined air pressure value corresponding with the predefined altitude value in a memory;
   measuring the ambient air pressure and determining an altitude reading therefrom;
   comparing the ambient air pressure measurement with the predefined air pressure value;
   storing the ambient air pressure measurement and altitude reading in the memory; and
   setting the initial altitude parameter to a value stored in the memory after determining that ambient air pressure measurement is within a predefined range.

16. The method of claim 15, wherein the steps occur substantially automatically according to predefined rules.

17. The method of claim 16, wherein the predefined rules correspond with at least one of time of day, day of week, week of month and month of year.

18. The method of claim 16, further comprising determining the predefined rules according to the habits of a person using the device.

19. A method for registering and displaying an altitude above sea level, the method comprising:

storing in a memory at least one of a predefined altitude value and a predefined air pressure value, and storing a predefined time value in the memory;

measuring an ambient air pressure at the predefined time to provide an altitude reading at the predefined time;

comparing the altitude reading with the predefined altitude value;

setting the predefined altitude value after determining that the comparison indicates the altitude reading is within a predetermined range; and displaying the predefined altitude value.

20. The method of claim 19, further comprising scheduling operation of at least one of the steps of measuring, comparing, and setting.

21. The method of claim 20, wherein the step of scheduling is determined at least in part by at least one of time of day, day of week, week of month and month of year.

22. The method of claim 19, further comprising storing the altitude reading in the memory after determining that the comparison indicates that the altitude reading is not within the predetermined range, and replacing the predefined altitude value with the, altitude reading.

23. The method of claim 22, further comprising storing a plurality of altitude readings in the memory over time.

24. The method of claim 19, wherein the step of setting includes using one of the plurality of altitude reading values stored in the memory.

25. The method of claim 19, further comprising storing additional information corresponding to the altitude reading value in the memory.

26. The method of claim 25, wherein the additional information includes air pressure, time of day when the air pressure is measured, the location where the air pressure was measure.

27. The method of claim 19, further comprising displaying at least one of time, date and geographic location.

28. The method of claim 19, further comprising receiving information representing at least one of altitude, geographic location and current time from a user.

* * * * *